Feb. 1, 1938. H. R. SEARING ET AL 2,106,764
PHONOGRAPH
Filed Jan. 27, 1932   2 Sheets-Sheet 1

INVENTOR
Hudson R. Searing
BY Axel F. Shipstedt
ATTORNEYS

Feb. 1, 1938. H. R. SEARING ET AL 2,106,764
PHONOGRAPH
Filed Jan. 27, 1932  2 Sheets-Sheet 2
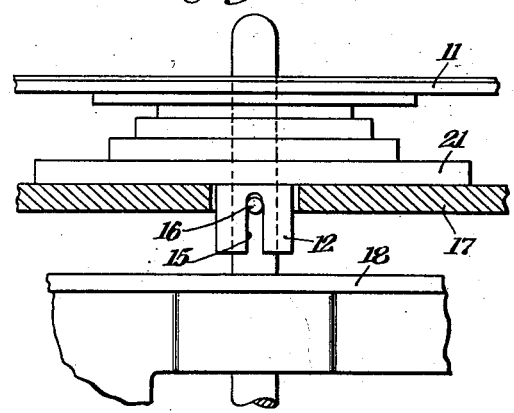
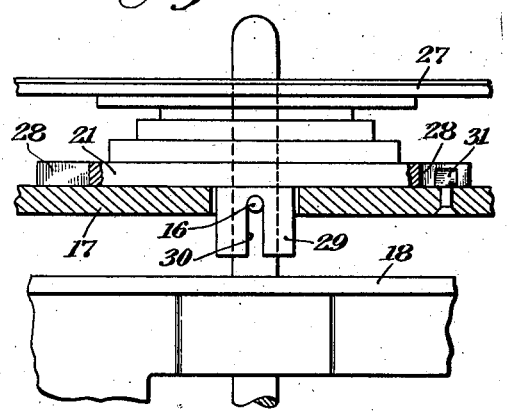
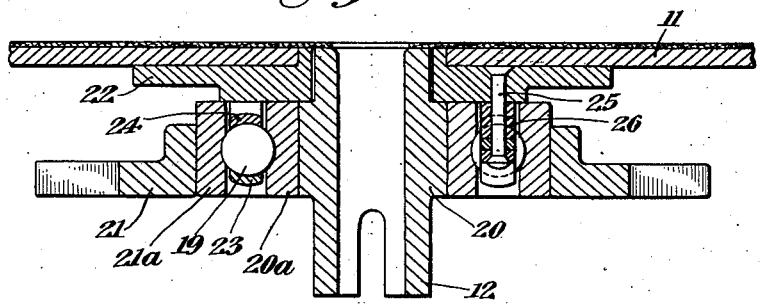
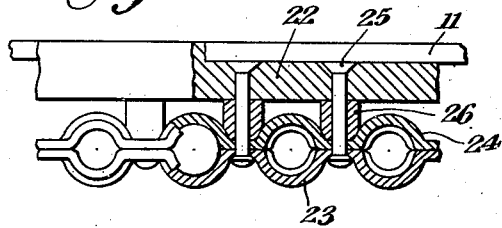
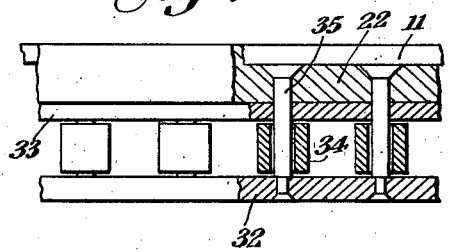
INVENTOR
Hudson R. Searing
BY Axel F. Shipstedt
ATTORNEYS Patented Feb. 1, 1938

2,106,764

UNITED STATES PATENT OFFICE 2,106,764

PHONOGRAPH

Hudson R. Searing, New York, and Axel F. Shipstedt, North Pelham, N. Y., assignors to Radio Corporation of America, a corporation of Delaware Application January 27, 1932, Serial No. 589,082

4 Claims. (Cl. 274—9)

For many years phonograph records have been restricted to a limited length by the size of the disc or cylinder on which the impression has been made. For clearness, the inscription has been made on a certain scale and the machine has been geared to operate at the speed necessary for clear reproduction. A slight adjustment of the speed mechanism has been provided in order to insure its running at the standard speed. This, in the disc type of machines, for example, has been 78 revolutions per minute. Modern improvements have made it possible to record the sounds on a considerably smaller scale, providing an increase in the length of the composition on a single record. These new records are driven at a much lower standard speed. In the disc machines, above referred to, the standard speed has been reduced from 78 to 33 revolutions per minute. The playing time of the new single records is about three times as long as one of the old records.

The old machines, however, were not adapted to such a substantial change of speed. Their speed adjusting mechanism was adapted only to correct slight departures from the standard. New machines have been made operating at the proper speed for the new records. Our invention provides a mechanism of a very simple character by which a machine of the old type can be made to operate the turn table or other record carrier at either of two speeds suitable respectively for the old and for the new records. Our improved mechanism may be incorporated in an old or new machine as a regular part of it or may be in the form of an attachment adapted to replace the regular turn table, or other record carrier. The accompanying drawings illustrate embodiments of the invention.

Fig. 3 is a similar view in a second position;

Fig. 4 is a view similar to Fig. 3 showing an alternative construction;

Fig. 5 is a central vertical section through the speed control device;

Fig. 6 is a detail of the same in elevation;

Fig. 7 is a similar view of an alternative construction.

Figure 1:
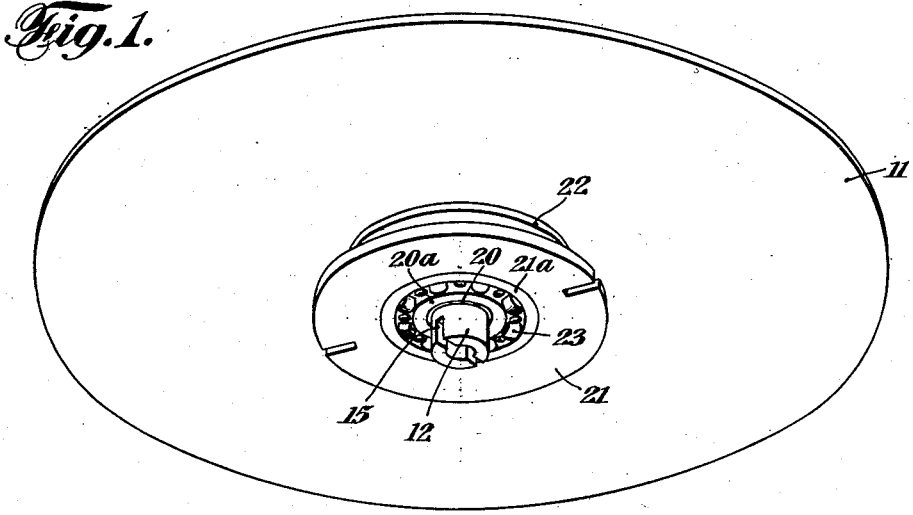
Fig. 1 is an underside perspective of a turn table with the speed control mechanism.

Referring to the drawings, the turn table 11 is the usual metal disc covered with felt on which the records are placed. It carries on its under side a speed control mechanism, the central member of which is a hollow shaft 12 which fits over the driving shaft or spindle 13 of the machine and which has diametrically opposite slots 14 and 15 in its lower end adapted to be dropped over a pin 16 which extends at one side only from the lower part of the driving shaft 13. The slot 14 (Fig. 2) is comparatively short so that the upper end of it rests on the pin and holds the mechanism above the wooden plate or motorboard 17 which usually covers the metal casing 18 in which the driving member and other related parts are carried. The slot 15 (Fig. 3) is of greater length so that when it is dropped over the pin 16 the speed control mechanism rests on the base or motorboard 17.

The speed mechanism is shown in section in Fig. 5. The hollow shaft 12 is the central member of a differential gearing. Ordinary gears and pinions may be used. Preferably, however, the gearing is in the form of an annular ball bearing, the balls 19 serving as the intermediary pinions engaged frictionally between a collar 20 on the central shaft, equivalent to a central gear, and an outer ring 21, equivalent to an outer gear with internal teeth. The turn table 11 is mounted on a hub 22 which is supported and free to rotate on the upper end of the central shaft or spindle 12. The annular series of balls are carried in a retainer or ball cage which may be of any usual or suitable design. Fig. 6 shows the same developed on a straight line. There are two retainer rings 23 and 24 respectively which are shaped to engage the balls and hold them in place but with freedom of rotation. Between each pair of balls is a rivet 25 passing through the two retainer rings and the hub 22 of the turn table, with filler blocks 26 to preserve the correct spacing. The details of this ball retainer and connections may be varied greatly. The turn table is thus fastened to the series of balls so that it moves with them about the central vertical axis. The shaft and the outer ring carry annular bearing rings 20ª and 21ª specially shaped to engage the balls, as in ordinary ball bearings.

The central hollow shaft 12 is driven at the same speed as the main shaft of the machine (78 revolutions per minute for example in the old machines). If the ring 21 is held stationary, and assuming that the balls act as true pinions or engaging gears, the series of balls will rotate about the central axis at a speed which is a function of the radii of the lines of contact which the balls make with respective inner and outer retaining rings, 20ª and 21ª, or the radii of the pitch lines of central and outer gears respectively where common pinions are used. The rotational speed of the balls or pinions about the central shaft or spindle is equal to the ratio of the lesser radii to the sum of the two radii times the rotational speed of the central shaft. This type of mechanism is, therefore, specially adapted to secure in compact and simple construction, a substantial reduction in speed, for example, from 78 to 33 revolutions per minute as in the present case.

The use of balls, in reversal of their usual anti-friction function, is practically effective because with a good fit their friction against the adjacent rings is in excess of the friction or resistance which the needle offers to the turning of the table. In practice it appears that this resistance from the needle is negligible. The required slow and uniform speed is maintained without any more variation than can be taken care of by the usual readjusting mechanism in the machine.

Figure 2:
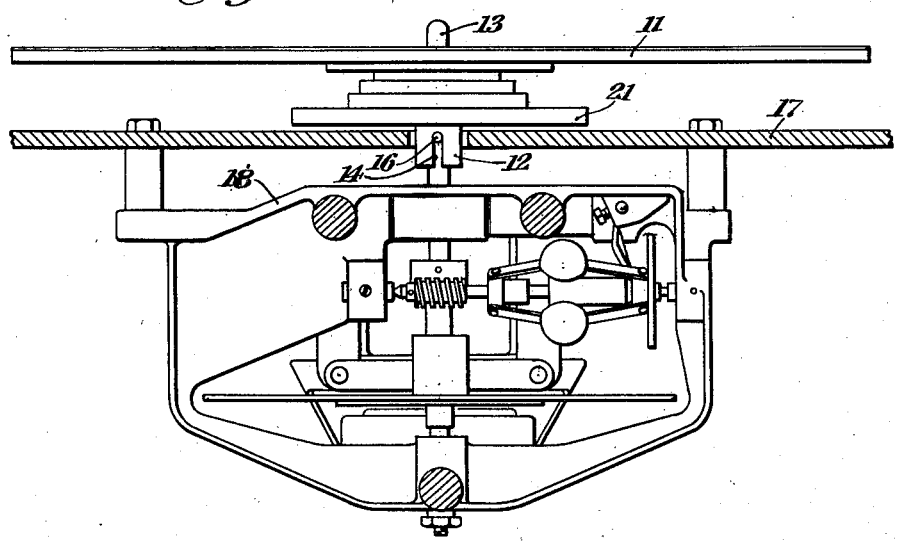
Fig. 2 is a side elevation of the same mounted on the driving shaft of the machine.

Various schemes may be provided for holding the outer ring stationary so as to secure the reduction of speed. Figs. 2 and 3 illustrate one arrangement. The driving shaft 13 is provided with a projecting pin 16 at one side only. The central hollow shaft 12 has the two slots of different lengths. When the longer slot is placed over the pin as in Fig. 3, the ring 21 rests on the fixed wooden base or motorboard 17. The friction between these parts is generally sufficient to hold the ring against movement while the hollow shaft and the balls rotate about the vertical axis, the rotation of the balls carrying the turn table against the slight resistance of the needle. However, when the shorter slot is dropped onto the pin 16 as in Fig. 2, the ring 21 is held clear of the base or motorboard 17 and is free to rotate. In such case, the entire mechanism rotates at the same speed as the driving shaft and the turn table also rotates at the same speed.

It will be apparent that in this arrangement the base or motorboard 17 serves as a brake or stop which is brought into engagement with the ring 21 to hold the latter stationary and cause the driving of the turn table at the differential speed; or which is released from the ring 21 so as to cause the driving of the turn table at the same speed as the main shaft. Various other schemes may be used for braking or locking the ring in one position and releasing it in the other.

In the constructions above referred to a single turn table 11 is used and is driven at either of the two desired speeds. The invention may, however, be embodied in an attachment which is adapted to replace the regular turn table of one of the old standard phonographs. Such old turn tables are provided with a hollow shaft similar to the shaft 12, but with slots of the same depth at each side adapted to hold the turn table in a free position above the base 17. I propose to change to a slow speed by removing the high speed turn table and substituting an additional turn table 27, (Fig. 4) which carries a differential gearing identical with that shown in the other figures; the ring 21, however, being provided with slots 28 in its periphery. The hub 29 has a pair of slots 30 at diametrically opposite points which are adapted to be lowered into the pin 16 of the main driving shaft. In this position the ring 21 may be in contact with or slightly above the wooden base or motorboard 17, the latter being provided with a pin 21 which enters one of the slots 28 and thus positively prevents rotation of the ring and produces rotation of the turn table at the desired differential speed.

Also with the arrangement of Figs. 2 and 3, the ring 21 may be roughened on the bottom, as by application of a felt strip or otherwise, so as to secure a stronger grip on the base or motorboard 17, or may be provided with a variety of other devices which hold it fast on the motorboard in the lower position and release it in the upper position. Similar with the attachment described in Fig. 4, various other gripping or locking means may be provided to hold the ring 21 fixed on the base or motorboard 17.

Instead of the ball bearings illustrated in Fig. 6 we may use an arrangement of Fig. 7 which is similar to a roller bearing, the rollers being carried by retaining rings 32 and 33 and the bearing faces of the central hollow shaft and the outer ring being similarly modified. The pins of the rollers 34 will be extended through the retaining rings 32 and 33 and fastened to the hub 22 which carries the turn table 11. The pins are illustrated at 35. The balls, rollers, pinions, or the like, (which are referred to herein generically as pinions) above described may be applied equally to the use of a single turn table with means for braking or releasing the outer ring or to a separate attachment which replaces the regular turn table and which upon insertion secures the outer ring in fixed position.

Various other modifications may be made without departing from the invention as defined in the following claims.

What we claim is:
1. A change-speed mechanism for a phonograph comprising in combination a turn table, a central shaft, a ring surrounding said shaft, pinions connected to said turn table and located between said ring and said shaft and forming therewith a unitary differential gearing, said shaft being hollow and being adapted to engage the driving shaft of the phonograph in either of two positions, in one of which said ring engages and is held by a fixed part of the phonograph, and in the other of which it is free.

2. In a phonograph turn-table construction, the combination of a hub adapted to be placed upon and have non-rotative engagement with a spindle of a phonograph, a support revolubly mounted on said hub, a turn-table carried by said support, and means arranged in said support for operative association of said spindle receiving member with said turn-table whereby the latter is operated by said phonograph spindle at differential speed with respect thereto.

3. In a device of the class described, the combination of a turn-table, a support fixed to the underside thereof, a hub revolubly mounted in said support concentrically with said turn-table, said hub being provided with a bore for receiving a spindle of a phonograph drive mechanism whereby said turn-table is supported on said spindle and is revoluble independently thereof, and operative connections between said hub and said turn-table whereby the latter is actuated by said spindle at a different speed with respect thereto.

4. In a device of the class described, the combination of a hub member adapted to be supported on and have operative engagement with a spindle of a phonograph driving mechanism, a support revolubly carried by said hub, a turn-table fixed to said support concentrically with said hub member, and reduction gearing interposed between said hub member and said support for actuating the latter and said turn-table by said spindle at reduced speed with respect thereto and in the same direction as said spindle.

HUDSON R. SEARING.
AXEL F. SHIPSTEDT.